Dec. 28, 1926.

A. SHAFFER

COOKING UTENSIL

Filed May 2, 1925

1,612,747

Inventor
ANITA SHAFFER.
By Victor J Evans
Attorney.

Patented Dec. 28, 1926.

1,612,747

UNITED STATES PATENT OFFICE.

ANITA SHAFFER, OF OAKLAND, CALIFORNIA.

COOKING UTENSIL.

Application filed May 2, 1925. Serial No. 27,549.

This invention relates to improvements in cooking utensils, and has particular reference to a combined fritter and waffle iron.

The principal object of this invention is to produce an iron which may be employed for the making of fritters, and then combining them with waffles in such a manner as to produce an appetizing food product.

Another object is to produce a device of this character which will cook the combined fritter and waffle in an efficient manner.

Another object is to produce a device of this character which is cheap to manufacture and one which may be employed in the ordinary household.

A further object is to produce a device of this character which will deliver a food product having greater nutritive value than is common in the ordinary waffle.

A still further object is to eliminate the use of large quantities of grease common in the cooking of fritters.

Other objects and advantages will be apparent during the course of the following description.

Figure 1:
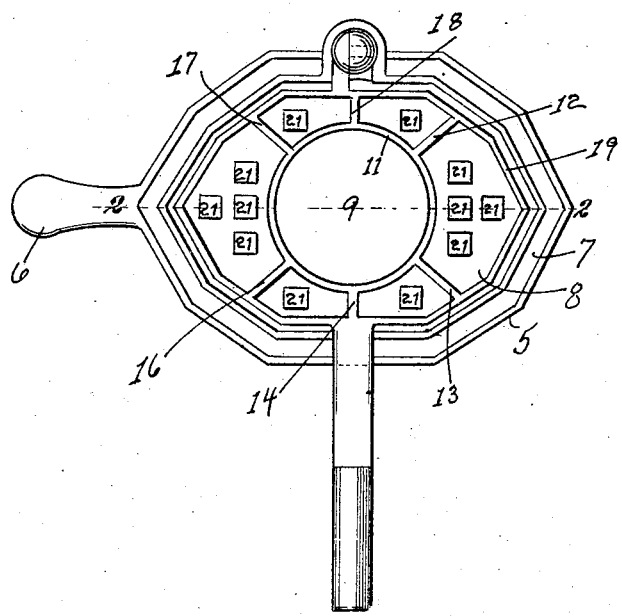
Figure 2:
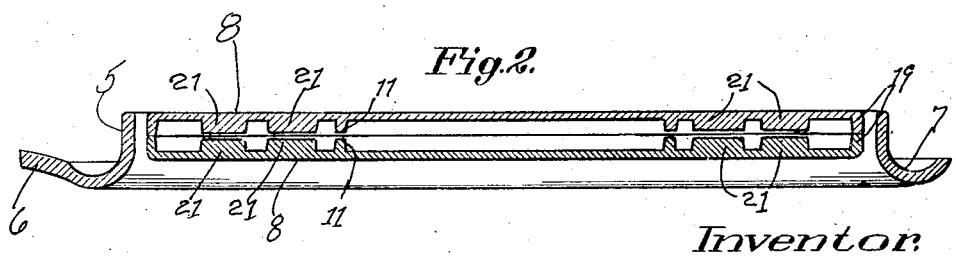

In the accompanying drawings forming a part of this specification, and in which like numerals are employed to designate like parts throughout the same, Figure 1 is a top plan view of my iron having one of the sections removed, and Figure 2 is a cross section taken on the line 2—2 of Figure 1.

In the making of fritters, it has been common to combine ingredients such as fish, oysters, clams, corn and the like with a batter which was then fried in deep grease, which produced a cooked product highly indigestible due to the grease content of the same.

I have therefore sought to produce a means for cooking such a batter and combining the same with a waffle in such a manner that the finished product has the appearance of being a single article.

In the accompanying drawings wherein for the purpose of illustration is shown a preferred embodiment of my invention, the numeral 5 designates the frame of my waffle iron which may be of any preferred shape and is provided with a handle 6 and a trough 7. This structure is common to the ordinary waffle iron, and needs no further description.

Pivotally supported in this frame are two co-acting members which form the cooking elements. One of these elements is shown in Figure 1 and is designated as a whole by the numeral 8.

At 9, I have shown a centrally disposed portion surrounded by an annular ring 11, while radially from this ring are a plurality of webs as shown at 12, 13, 14, 16, 17 and 18. These webs serve to divide the remainder of the cooking elements between the ring 11 and the up-standing rim 19, into a series of compartments.

Within each of these compartments is placed a plurality of heat conducting projections as shown at 21. These projections may be of any desired number and when the two cooking elements are super-imposed one upon the other, these heat conducting elements do not touch, or in other words, are spaced a slight distance from each other which permits the batter to form connecting webs between all of the portions of the cooked product.

In employing my device, I place on the centrally disposed portion 9, a quantity of the fritter batter and I then place in each of the compartments formed upon the rim 19, webs 12 and ring 11, a quantity of waffle batter. The quantity being sufficient to fill the compartments when the same starts to cook and raises.

During the cooking operation, the batter in the various compartments, will flow toward each other and form webs between the compartments thus making the product a single unit.

By placing the fritter batter in the center of the device, the greater amount of heat received from the oil, gas or electric burner placed therebelow results in a more thorough cooking of this portion of the product, while the waffle portion will receive a slower cooking, which is proper in the perfect production of the waffle portion of the cooked product.

It will thus be seen that with my improved iron, it is possible to make a combined fritter and waffle which will be pleasing in appearance and palatable.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, an iron comprising a pair of co-acting pivoted members, a projecting ring formed on each member defining a plain central compartment adapted to receive fritter batter, a plurality of waffle compartments having heat conducting projections, said waffle compartments being arranged about said ring and adapted to receive waffle batter, and the ring of each member being spaced from the other when said members are superimposed with respect to each other to allow the batters to adhere and form an integral fritter and waffle.

2. A combined waffle and fritter iron of the character described comprising a pair of co-acting members, a ring projecting from each member and providing plain central compartments, a plurality of compartments surrounding the plain central compartment and having heat conducting projections, said central compartment being adapted to receive fritter batter and the remaining compartments waffle batter, and said rings being arranged in spaced relation when operatively associated to allow the respective batters to adhere at their confronting edge portions so as to form an integral fritter and waffle.

In testimony whereof I affix my signature.

ANITA SHAFFER.